United States Patent [19]
Lai

[11] Patent Number: 5,956,751
[45] Date of Patent: Sep. 21, 1999

[54] COMPUTER MEMORY MANAGEMENT SYSTEM USING PHYSICAL SEGMENTATION SPACE ALLOCATION

[75] Inventor: Shiang-Jyh Lai, Taipei, Taiwan

[73] Assignee: Industrial Technology Research Institute, Taiwan

[21] Appl. No.: 08/792,471

[22] Filed: Dec. 14, 1995

Related U.S. Application Data

[63] Continuation-in-part of application No. 08/495,955, Jun. 28, 1995, abandoned.

[51] Int. Cl.[6] ............................................. G06F 12/00
[52] U.S. Cl. ........................... 711/172; 711/209; 711/206
[58] Field of Search ................................... 711/172, 206, 711/209; 395/500

[56] References Cited

U.S. PATENT DOCUMENTS

| | | | |
|---|---|---|---|
| 4,876,651 | 10/1989 | Dawson et al. ........................ | 364/449 |
| 4,885,680 | 12/1989 | Anthony et al. ....................... | 364/200 |
| 4,972,338 | 11/1990 | Crawford et al. ..................... | 711/206 |
| 5,129,070 | 7/1992 | Dorotte ................................. | 711/209 |
| 5,420,993 | 5/1995 | Smith et al. ........................... | 395/400 |
| 5,509,131 | 4/1996 | Smith et al. ........................... | 711/206 |
| 5,652,872 | 7/1997 | Richter et al. ........................ | 395/500 |

OTHER PUBLICATIONS

Structured computer organization, third edition, Andrew S. Tanenbaum, 1990.

*Primary Examiner*—John W. Cabeca
*Assistant Examiner*—Nasser Moazzami
*Attorney, Agent, or Firm*—Proskauer Rose LLP

[57] ABSTRACT

A displacement segmentation memory management system is based on physical segmentation space allocation. A program is divided into segments defined by the physical memory space available. One or more segment descriptor table is created for each task. These may be divided into groups. The virtual address for a data word in a program is translated into the physical address in the following way. The virtual address is compared with entries on a limit table. The matching limit entry determines the proper segment entry. The proper segment value is added with the virtual address to determine a proper address block. This address block is concatenated with the page offset field to generate a physical address of the requested data.

33 Claims, 13 Drawing Sheets

| SEGMENT | PAGE | BLOCK |
|---------|------|-------|
| 6 | 02 | 019 |
| 6 | 04 | A61 |
| ⋮ | ⋮ | ⋮ |

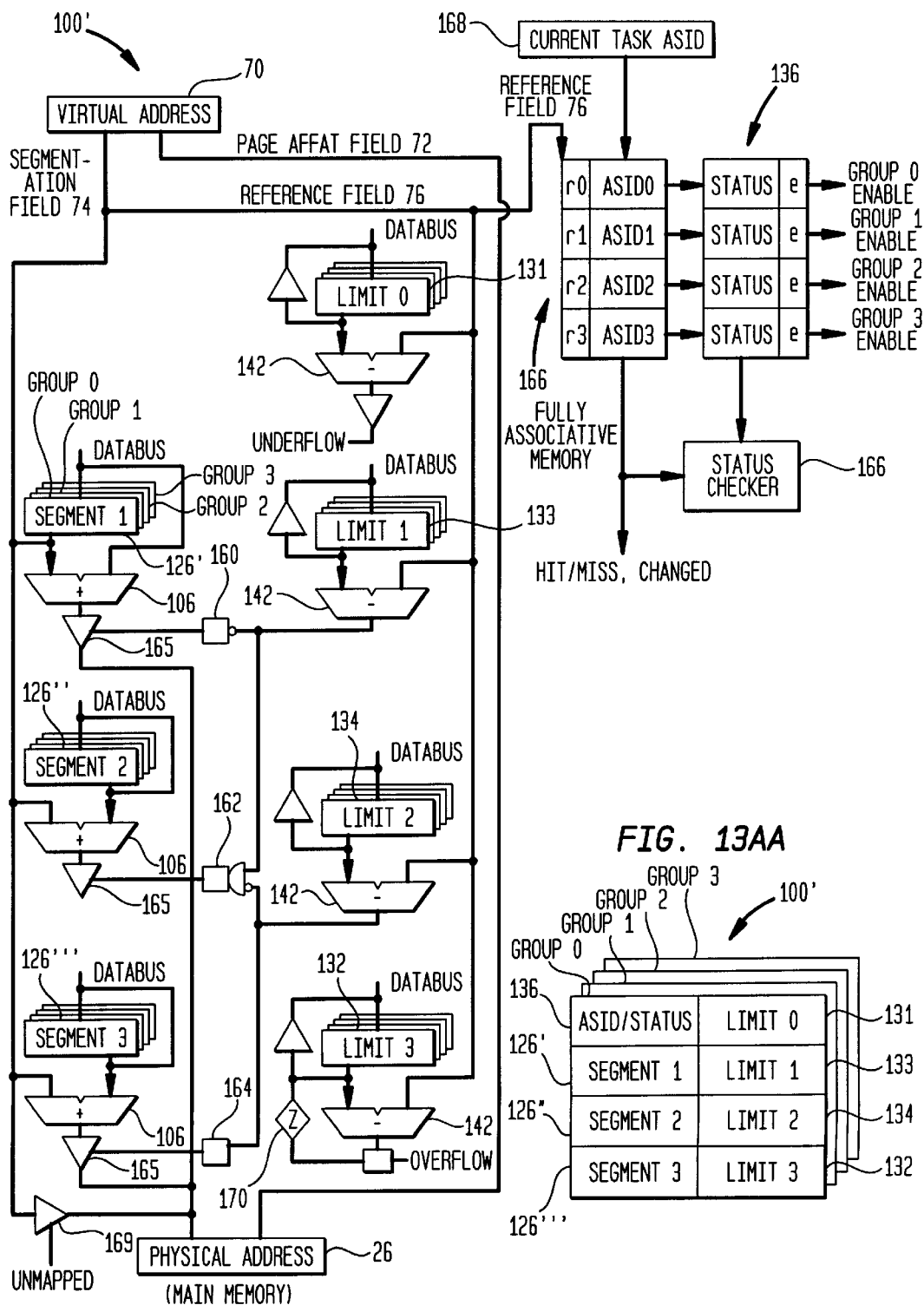

COMPUTER MEMORY MANAGEMENT SYSTEM USING PHYSICAL SEGMENTATION SPACE ALLOCATION

Related Application

The application is a continuation-in-part of U.S. patent application Ser. No. 08/495,955, filed Jun. 28, 1995.

FIELD OF THE INVENTION

The present invention is directed to a memory management system for a computer system and, more particularly to a displacement segmentation memory management system.

BACKGROUND OF THE INVENTION

FIG. 1 shows a computer system 20. The computer system 20 has one or more processors 22 connected to a system bus 24. A main memory 26 and one or more input/output (I/O) bridges 28 are also connected to the system bus 24. An input/output device 30, such as a computer keyboard and display screen, is connected to I/O bridge 28.

The processor 22 executes computer program instructions. In the course of executing these instructions, the processor may issue data and program instruction access commands. Data and program instructions are stored as data in the main memory 26.

The main memory 26 is the memory device which communicates directly with the processor 22. The main memory 26 includes an array of storage locations for storing data. Data is typically organized into lines of data words. A typical data word consists of eight bits (i.e., logical "0s" and "1s"). Each physical storage location, or address, is represented by a number which identifies the storage location in main memory. The system bus 24 transfers data addresses and commands between the devices, i.e., the processor 22, main memory 26, and I/O bridge 28, connected thereto.

A typical computer main memory 26 may be a RAM which stores a number of computer programs and data tables which are currently used by the processor 22. All other information not being currently used by the processor 22 is stored in an auxiliary memory 31, such as a hard disk, and this information is transferred to the main memory 26 on a demand basis.

When several programs reside in the main memory 26, the computer system is in a "multi-programming environment". In a multi-programming environment, computer programs and other data are transferred to and from the auxiliary memory 31 and the main memory 26 as required by the processor 22. In a multi-programming environment, it may be necessary to move programs and data to different locations in the main memory 26. It may also be necessary to separate the programs into parts in order to fit the program into the spaces available in the main memory 26. In addition, in a multi-programming environment sometimes it is desirable to vary the amount of memory used by a particular program; and to prevent a program from changing other programs.

As programs are loaded into a computer's main memory from an auxiliary memory 31, memory size constraints and other factors such as existing memory usage of the main memory 26 require programs to be stored in non-continuous memory areas. Thus, a program which is logically continuous (i.e., flows from one instruction to the next) may be physically stored in memory in a non-continuous way (i.e., one instruction may not be physically located next to the previous or subsequent instruction). Therefore, a computer needs a way to keep track of programs and data stored in the main memory 26. Thus, memory management systems were created to supervise the flow of information throughout the computer and to keep track of and locate each command of a computer program or other data stored in main memory 26.

A typical memory management system comprises both software and hardware for managing various programs stored in a computer's main memory 26. The memory management software portion of the system may be part of an overall operating system available in many computers. A memory management hardware unit is described below.

FIG. 1 shows a memory management unit (MMU) 32 connected to the data bus 24. A typical memory management hardware unit 32 has three basic components. The first component performs dynamic storage relocation which maps logical memory addresses to physical memory addresses. A typical dynamic storage relocation hardware performs a mapping process. Because the program size and the logical structure of the program to be stored in main memory do not always allow a program to be physically stored in continuous memory addresses, it is often convenient to divide the programs and data into logical parts called segments. A segment is a set of logically related instructions or data elements. A segment may be generated by the programmer or by the operating system. An example of a segment is a sub-routine, a data array, a symbol table, or a user's program.

The second component of a typical memory management unit 32 ("MMU") performs a function allowing different users to share common programs stored in memory. Program sharing is important to a multi-programming system. For example, several users may wish to compile programs written in a particular programming language. These users should be able to share a single copy of the compiler program rather than each having to use a separate copy in memory.

The third component of a typical MMU protects information against unauthorized access between users and preventing users from changing operating system functions. Information protection is necessary, for example, to prevent unwanted interaction or one user's unauthorized copying of another user's program. Another aspect of this protection is preventing a user from performing operating system functions or to maintain the secrecy of certain confidential information or programs.

Each program instruction in a program segment may be either a virtual address or a logical address. A virtual address is an address which correlates a data word in a program to its location in physical memory. The physical memory space in the main memory 26 is divided into groups of equal size. The virtual memory groups the computer program into "pages" of the same size as the physical memory groups. A logical address is similar to a virtual address, except that logical address space is associated with variable-length segments rather than fixed-length pages. These variable-length segments, if large, may be sub-divided into smaller fixed length pages.

As seen in FIG. 2, a logical address 33 is partitioned into three fields, a segment field 34, a page field 36, and a word field 38. The segment field specifies 34 a segment number, the page field 36 specifies the page within the segment, and the word field 38 gives the specific word within the page. The length of the segment may vary from one page to as many as $2^k$ pages, where k is the number of bits in the page field.

FIG. 2 shows how a logical address is mapped into a physical address by a conventional memory management unit. The logical address refers to a particular data word, such as a program instruction (also referred to as a command or task) or piece of data. Although typically this data word logically resides between related instructions or data within a program, it may physically reside at a location remote from logically adjacent instructions or data.

Consider the following example illustrated in FIG. 2. A program having a number of segments is to be loaded into main memory 26. The segment number entered in the segment field 34 of the logical address refers to an address for an entry in a table called a segment table 40. When the program is physically loaded into the main memory 26, the program segments are distributed among the blocks of empty space in physical memory found by the operating system. The correspondence between the physical memory block and logical page number is entered on a segment table 40.

The data word located at logical address 6027E (all numbers are in hexadecimal) is requested by the processor 22. This means that word 7E (i.e., the 126th word) on page 2 of segment 6 is requested.

The entry in the segment table 40 is called a page table base. The page table base corresponding to the logical address segment number is added to the page number given in the logical address (i.e., the entry in the page field 36 of the logical address). The sum of these numbers produces a pointer which points to an address for an entry in a table called a page table 42. In this example, segment 6 has a base address 35. The segment has five pages 35–39. Thus, the page table 42 location for page 2 of segment 6 is at location 35+2=37 on the page table 42.

The value found in the page table provides a "block number". A "block number" is the most significant digits of a physical address in physical memory where the data corresponding to the logical address is located. The "block" typically includes a plurality of physically contiguous data words and thus represents a "block" of physical memory. If a virtual address is used, these "blocks" are the equal sized portions of memory. If a logical address is used, these "blocks" may vary in size. In this example, that block is 019.

The block number in the page table 42 is concatenated with the entry in the word field 38 of the logical address 32 of FIG. 2 in the logical address to produce the final physical mapped address. Block 019 is concatenated with word field entry 7E to provide the 20-bit (in binary) physical address 0197E. This physical address is where the requested data word physically resides in main memory 26. This data word may now be accessed from the main memory 26 and delivered via the data bus 24 to the processor 22.

The segment table 40 and page table 42 may be stored in two separate small memories or in main memory 26. In either case, a memory reference from the processor 22 requires three memory accesses: a first access to obtain the page table base from the segment table 40, a second access to obtain the block number from the page table 42, and a third access to retrieve the requested data word from main memory 26. This slows the system significantly in comparison to a conventional system which directly accesses the main memory and thus, requires only one reference to memory.

The memory shown in FIG. 3 is used to avoid this speed penalty. FIG. 3 shows a fast associative memory 44, which is often used to hold a number of the most recently referenced table entries. When a given block is referenced, the block's value and its corresponding segment and page numbers are entered into the associative memory 44. The mapping process is performed by first comparing the logical address with the entries in the associative memory 44. If the segment and page entries 34, 36 of the logical address 32 match a segment and page stored in the associative memory 44, the block stored in the associative memory 44 is concatenated with the word field entry 38 in the logical address 32 to produce the physical address. The mapping delay is only that of searching the associative memory 44. If no match occurs, the mapping process is performed using the slower mapping table of FIG. 2 and the segment and page number for the requested block is stored in the associative memory 44 for future reference.

FIG. 4A illustrates one type of prior art memory management unit 45 which is disclosed in U.S. Pat. Nos. 4,488,256 and 10 4,473,878 to Zolnowsky et al. These references disclose translating a logical (or virtual) address 33 into a physical address using, for example, a fully associative memory 46. Each entry in the memory is mapped to one page of space. This method uses a mapping table 47 to translate from the logical to the physical address. This memory management unit searches the mapping table 47 to determine the physical page number of the requested data. This method performs a 1-to-1 mapping table search with a "match/no match" result.

FIG. 4B illustrates a second memory management unit 50 which is disclosed in U.S. Pat. Nos. 5,321,836 and 4,972,338 to Crawford et al. and 4,442,484 to Childs, Jr. et al. Segments describe separately protected areas of memory. All of the data words in a segment have the same "protection attribute." These attributes protect the data word from being inadvertently corrupted. These references disclose address translation using segment descriptor tables such as a global descriptor table (GDT) and a local descriptor table (LDT). The logical address base of a data word (or task) includes the descriptors in the GDT and LDT.

This second memory management unit performs a virtual to physical address translation as follows. A virtual address 33 contains a segment field 34 and an offset field 52. The segment field 34 is a "segment selector" and the offset field locates the data word within the segment. The segment field identifies the proper entry on a segment table 40. The segment table 40 entry contains a base address of the segment; the limit (or size) of the segment; and the protection attribute of the segment. The offset 52 is added with the entry of the segment table 40 to obtain a physical address. The offset of the virtual address is compared with the segment limit by a comparator 54. If the offset is outside of the limit, a fault is generated. A second translation which divides the physical address into pages may also be performed.

FIG. 4C provides an example of a drawback of the prior art methods. If a program is to be loaded into main memory 26, and the associative memory is unavailable or turned off (i.e., the segments are not further divided into pages), the program segment allocation is performed by the user or a compiler. In this case, there are three segments having 25k, 20k, and 63k bytes, respectively. Each segment has a different protection attribute. The operating system has to search the main memory 26 for physical memory space and load the segment into these spaces. The physical memory space includes one 24k, two 60k, and one 40k spaces. Even though the physical available space is 24k+60k+60K+40k=184k bytes and the program size is 25k+20k+63k=108k bytes, the 63k byte segment cannot be loaded into the main memory 26 because there is insufficient segment space, even though the amount of physical memory exceeds the amount of program memory by 76k bytes.

It is an object of the present invention to provide an improved apparatus and method for a memory management unit.

SUMMARY OF THE INVENTION

These and other objects are achieved by a displacement segmentation memory management system ("SMMU"). This management system is based on physical segmentation space allocation. A program is divided into virtual segments defined by the physical memory space available. Preferably, this segmenting is performed without regard to protection attributes or whether the fragment contains a partial or complete program or a partial or complete data array, or a combination of instruction or data.

A virtual address according to this system illustratively has four fields: (1) a segmentation field; (2) a page offset field; (3) a reference field; and (4) a privilege field. The segmentation field allows the virtual address to be translated into a physical address by indicating the segment in which the requested data word is found. The page offset field indicates the offset within a given page that the requested data word is found. The reference field is optional, and is used to extend the segment table into a segment table file. The privilege field determines, among other things, whether a data word is a user or kernel data word, the protection attribute, and whether it is mapped (requires translation) or unmapped.

A displacement segmentation memory management system is based on physical segmentation space allocation. A page available mapping table indicates which physical memory spaces are available. A program is divided into segments defined by the physical memory space available. One or more segment tables is created for each program. These segment tables may be divided into groups.

The virtual address for a data word in a program is translated into the physical address in the following way. The limit and segment tables lead appropriate entries into limit and segment registers in the SMMU. These registers may be extended into register files, so that each register has groups of entries. If a register is extended into a register file, a field in the virtual address may enable one group in the register files.

The virtual address is compared with the group entries on a limit table. If the virtual address falls within an upper and lower limit entry, there is a match. The matching limit entry determines the proper segment table entry. The segment table entry is the physical address boundary minus the virtual address. Thus, the segment table entry is added with the virtual address to determine a proper page address block. This page address block is concatenated with the page offset field to generate a physical address of the requested data word.

A preferred structure includes five registers. A limit register contains address boundaries. A segment register contains the virtual address and physical address displacement. A data word pointer base register determines a data word segment pointer. A data word segment table base register determines a data word segment table address. A status register contains information regarding the data word. Another embodiment according to the present invention includes a sequential segment register structure having $2^n$ limit registers, $2^n-1$ segment registers, and one address space identifier ("ASID")/status register. The limit and segment entries are listed sequentially in ascending order of their addresses.

BRIEF DESCRIPTION OF THE DRAWINGS

These and other features of the present invention will become apparent from the following detailed description, in conjunction with the following drawings, wherein:

FIGS. 13A and 13B are block diagrams of a segmented memory management unit according to embodiments of the present invention;

FIGS. 13AA and 13BB are simplified diagrams of the SMMUs in FIGS. 13A and 13B.

DETAILED DESCRIPTION OF A PREFERRED EMBODIMENT

The present invention is directed to displacement segment memory management. This management method is based on physical segmentation space allocation.

Figure 5:
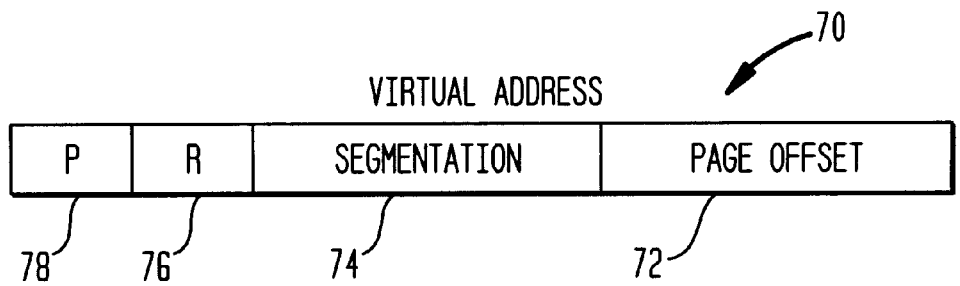
FIG. 5 is a block diagram of a virtual address used by a memory management system according to the present invention.
Figure 6:
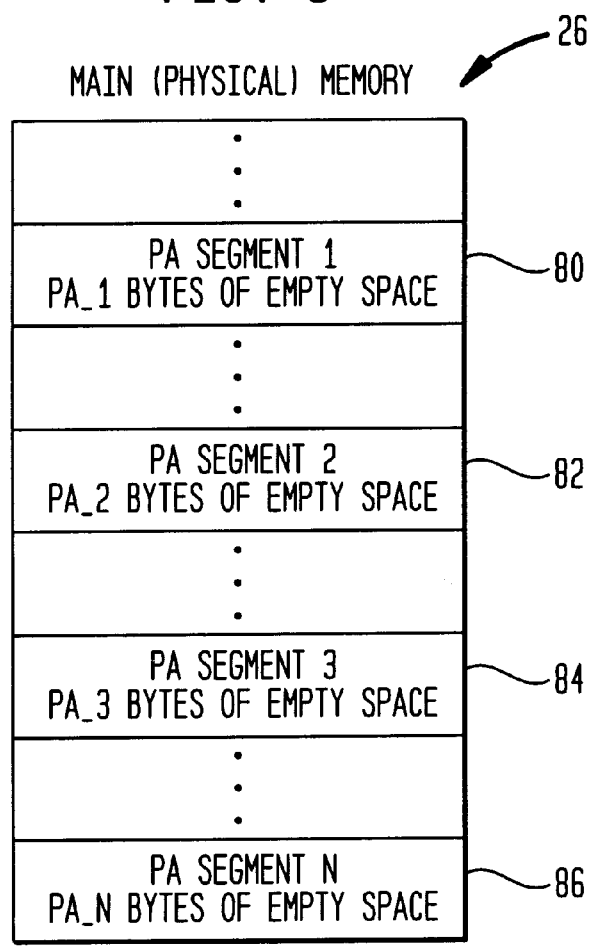
FIG. 6 is a block diagram of a main memory having its available physical space mapped by a memory management system.
Figure 7:
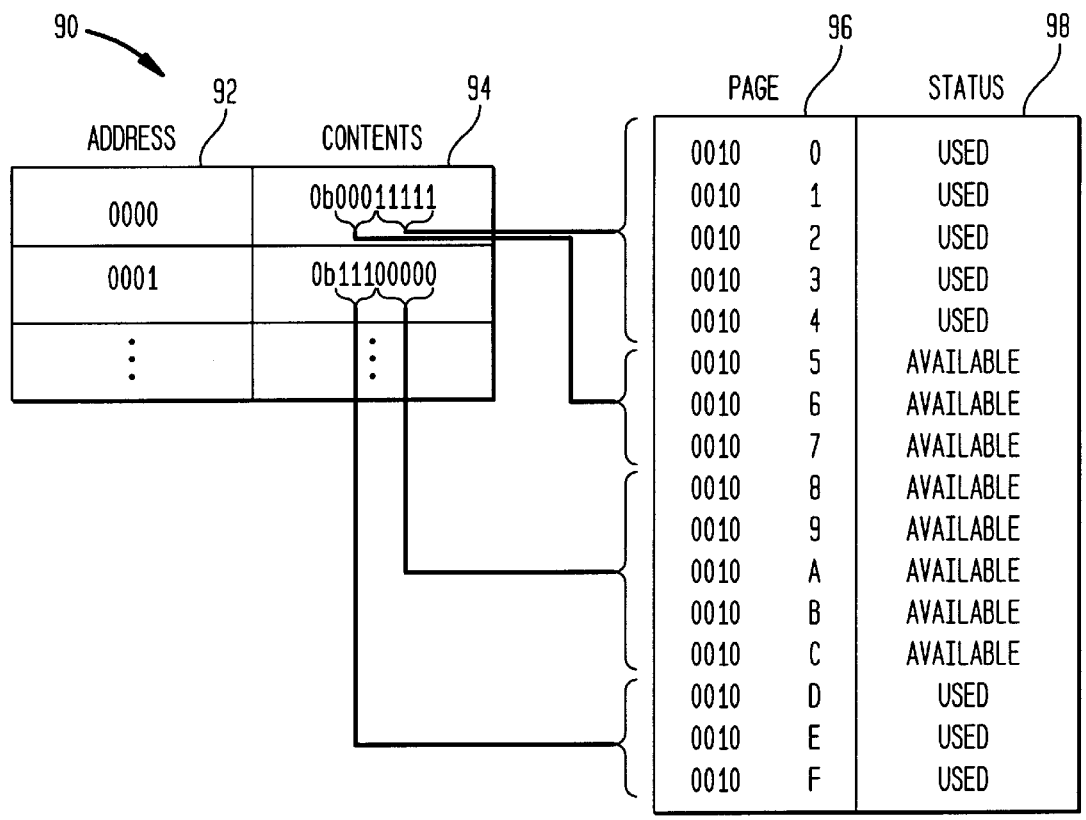
FIG. 7 is a page available mapping table according to an embodiment of the present invention.

This description is divided into several sections:

(A) "The Virtual Address" and FIG. 5 describe the format of a virtual address to be translated by the MMU of the present invention;

(B) "Loading A Program Into Memory" and FIGS. 6 and 7 describe how a program is segmented and stored on a main memory.

Figure 8:
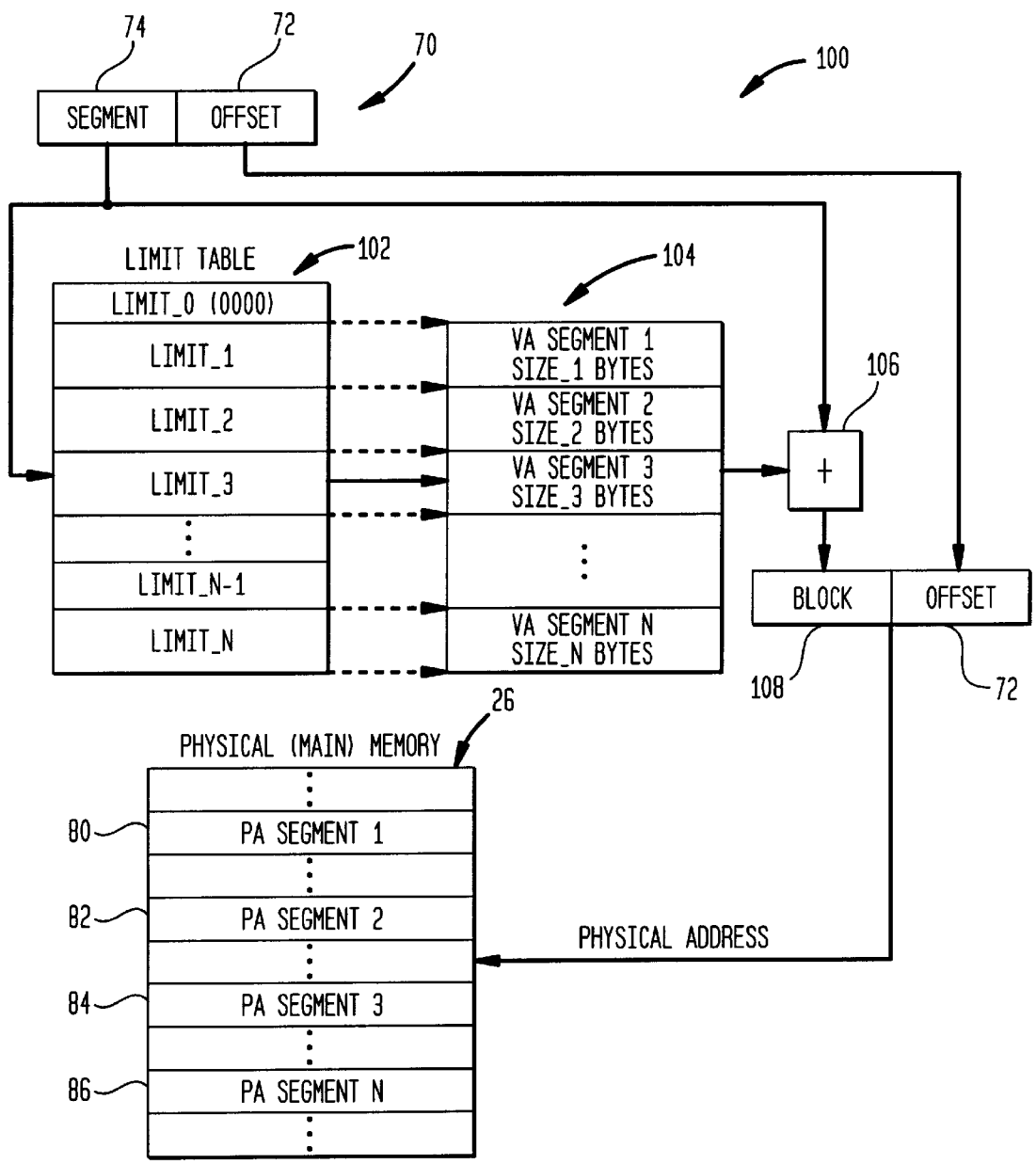
FIG. 8 is a block diagram of segmented memory management unit according to the present invention.
Figure 9:
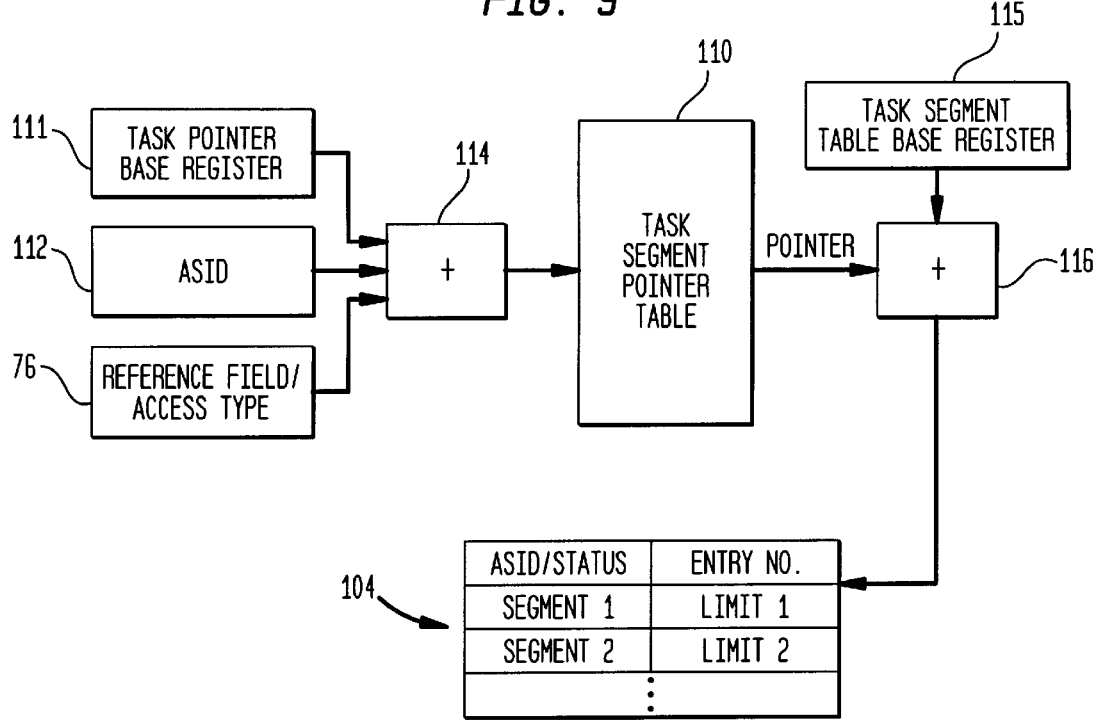
FIG. 9 is a data word segment pointer table according to an embodiment of the present invention.
Figure 11:
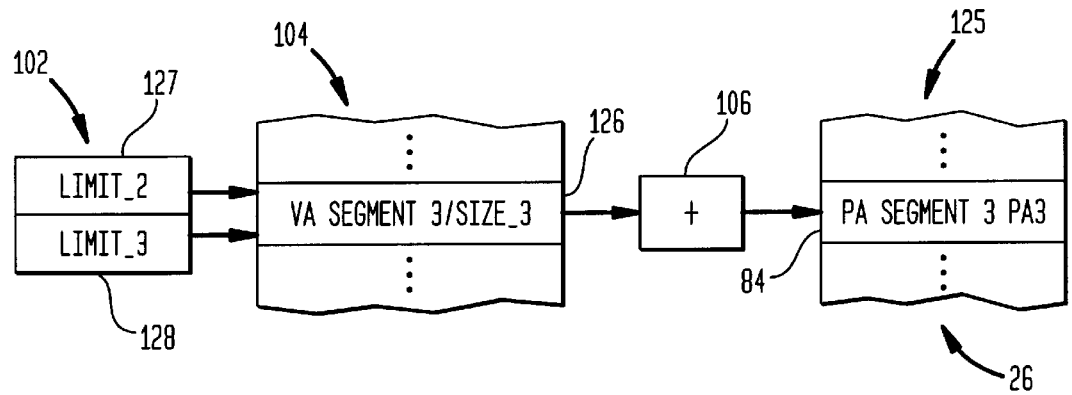
FIG. 11 is a portion of the memory management system illustrated in FIG. 4B.
Figure 12:
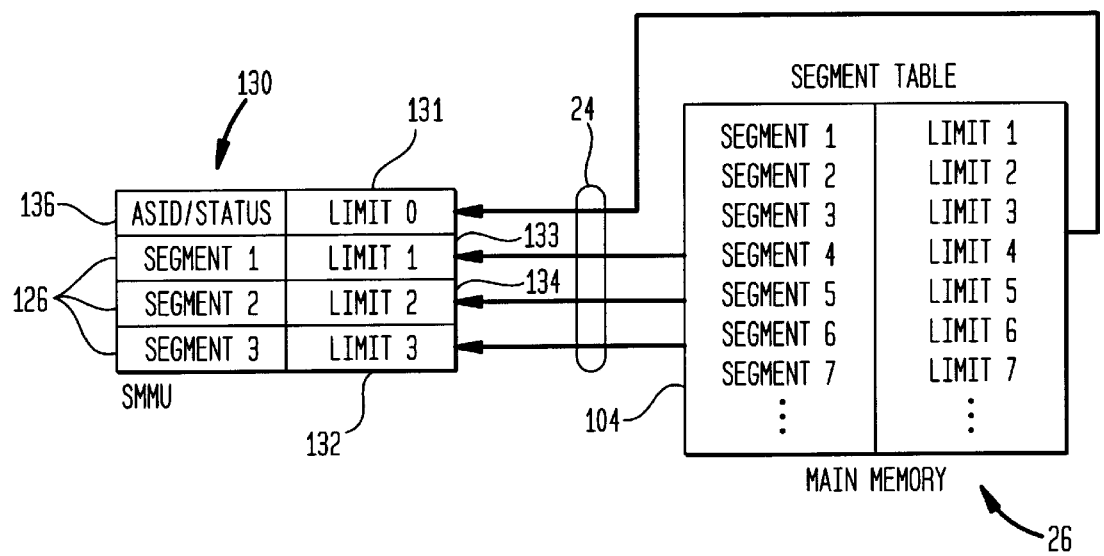
FIG. 12 is a sequential segment register according to an embodiment of the present invention.
Figure 16:
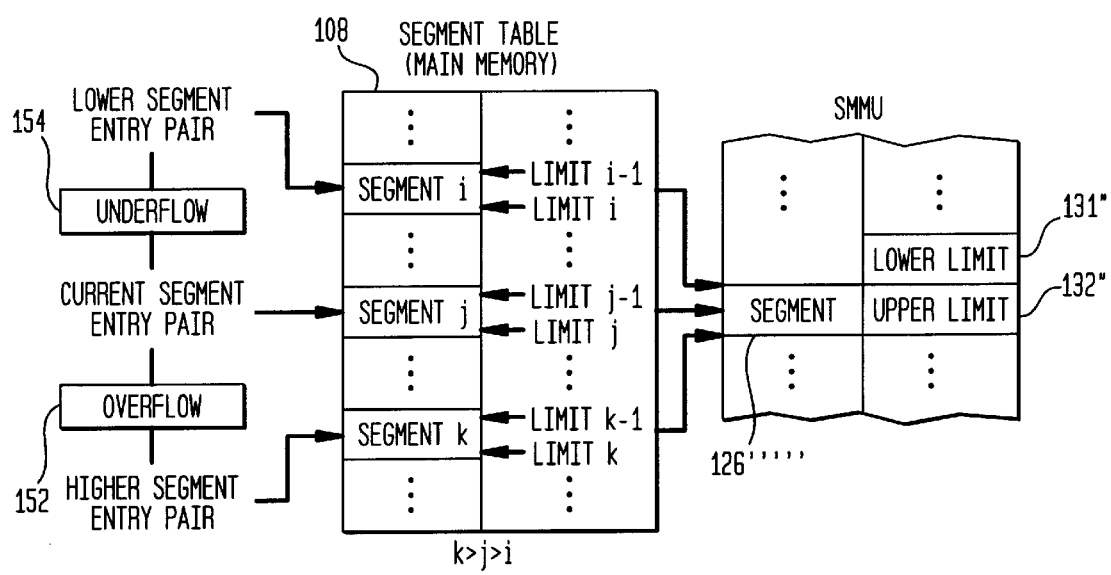
FIG. 16 is a block diagram illustrating the underflow/overflow exception according to an embodiment of the present invention.

(C) "Translating The Virtual Address Into the Physical Address" and FIG. 8 introduce the SMMU of the present invention and a describe how the virtual address of FIG. 5 is translated into a physical address;

(D) "Other Tables Created for the SMMU" and FIGS. 8, 9, and describe tables created to aid the present invention in translating from a virtual address to a physical address;

(E) "The SMMU Hardware" describes illustrative embodiments of the hardware of the present invention:

(1) "The Basic Segment Register" and FIG. 11 describe a basic SMMU structure;

(2) "The Sequential Segment Register Structure" and FIG. 12 describe an extended SMMU structure;

(3) "Preferred SMMU Hardware Designs" and FIGS. 13A, 13AA, 13B, 13BB, 14, and 15 describe preferred designs for the SMMU of the present invention;

(F) "Segment Register Reload and Underflow/Overflow Operations" and FIG. 16, describe certain features of the present invention;

(G) "Design Considerations" describes SMMU structural design considerations; and (H) "Conclusion" summarizes the present invention.

(A) The Virtual Address

FIG. 5 illustrates a virtual address format 70 as may be used by the present invention. The address includes a page offset field 72, a segmentation field 54, a reference field (R) 76, and a privilege field (P) 78.

The page size depends on the system architecture definition. The page size determines the number of bits in the page offset field 70. 4k page sizes is preferred and 8k, 16k, 32k, 64k and others are also common. The page offset field 70 is a virtual address displacement. The page offset field 72 typically requires a bit field between 12 (i.e., 4k) and 16 (i.e., 64k) bits. A 12 bit field is preferred in this design. The page offset field may also be used for directly translating an unmapped virtual address into a physical address.

The segmentation field 74 allows the virtual address to be translated into a physical address. The segmentation field 74 can be designed to be any bit length, but is preferably equal to a segment table (see FIG. 8 and 9) bit length, because the segment table contains physical segment addresses which are used as virtual address displacements and thus is equal to a displacement recorder between virtual and physical addresses. The segmentation field 74 bit length is preferably equal to a limit table (element 52 in FIG. 4B) bit length, because the limit table contains virtual address boundaries for the virtual address segments and thus is similar to a virtual address segment boundary checker. A 16 bit segmentation field design is preferred in the present invention.

The reference field is optional to the segmented memory management unit ("SMMU") system of the present invention. If there is only one segment table per program, then this field may be omitted. However, if there are more than one segment tables per program, then the reference fields should not be omitted and is used to extend the segment table (element 108 in FIGS. 8 and 9 below).

The privilege field 78 determines whether the data word is mapped or unmapped and whether the data word is in user or kernel mode. The privilege field 78 follows MIPS R3000 architecture, and is preferably arranged as follows:

0x-user mode
10-kernel mode unmapped virtual to physical address
11-kernel mode mapped virtual to physical address.

This will be discussed in more detail below.

(B) Loading A Program Into Memory

Figure 1:
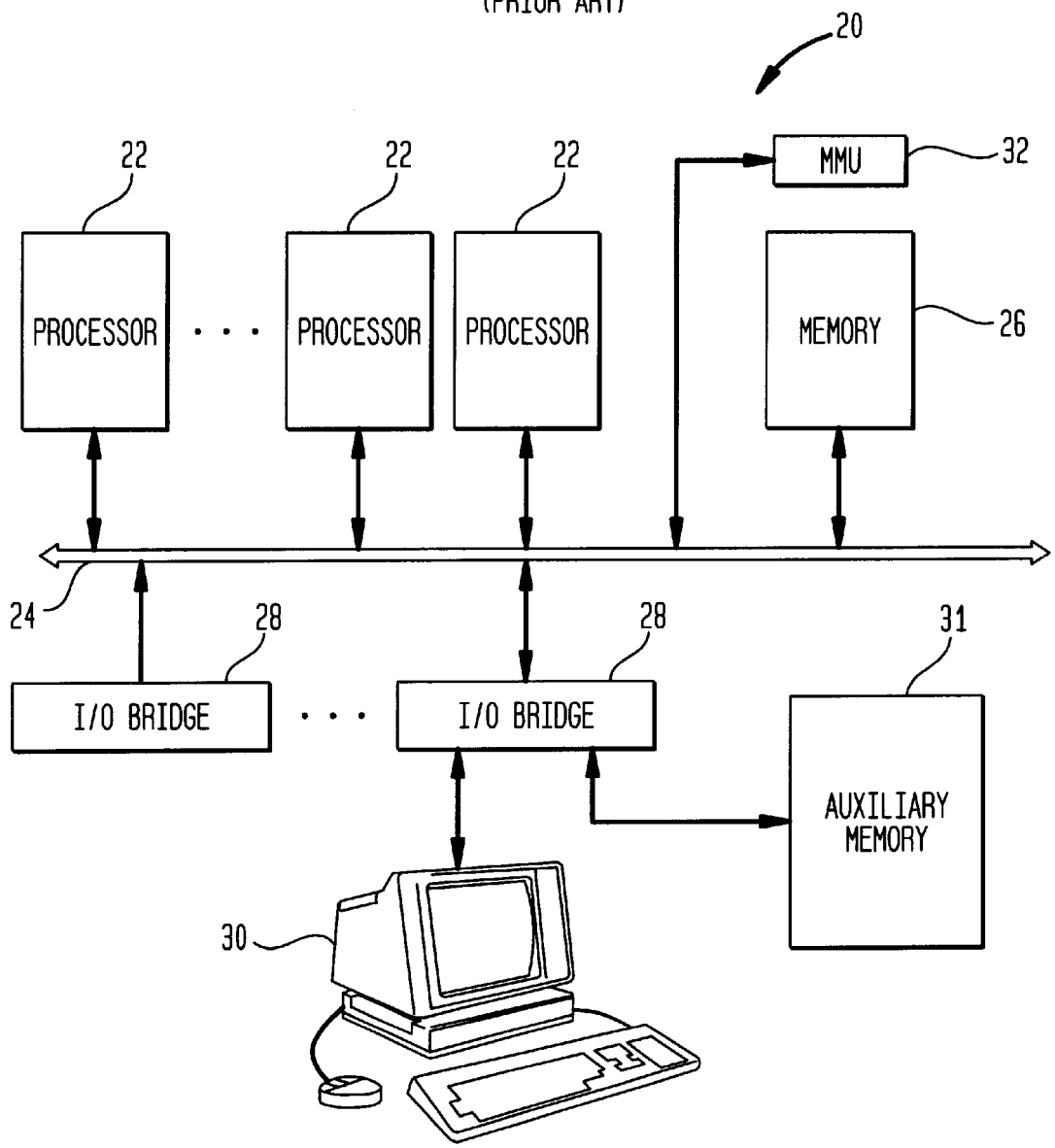
FIG. 1 is a block diagram of a computer system.
Figure 2:
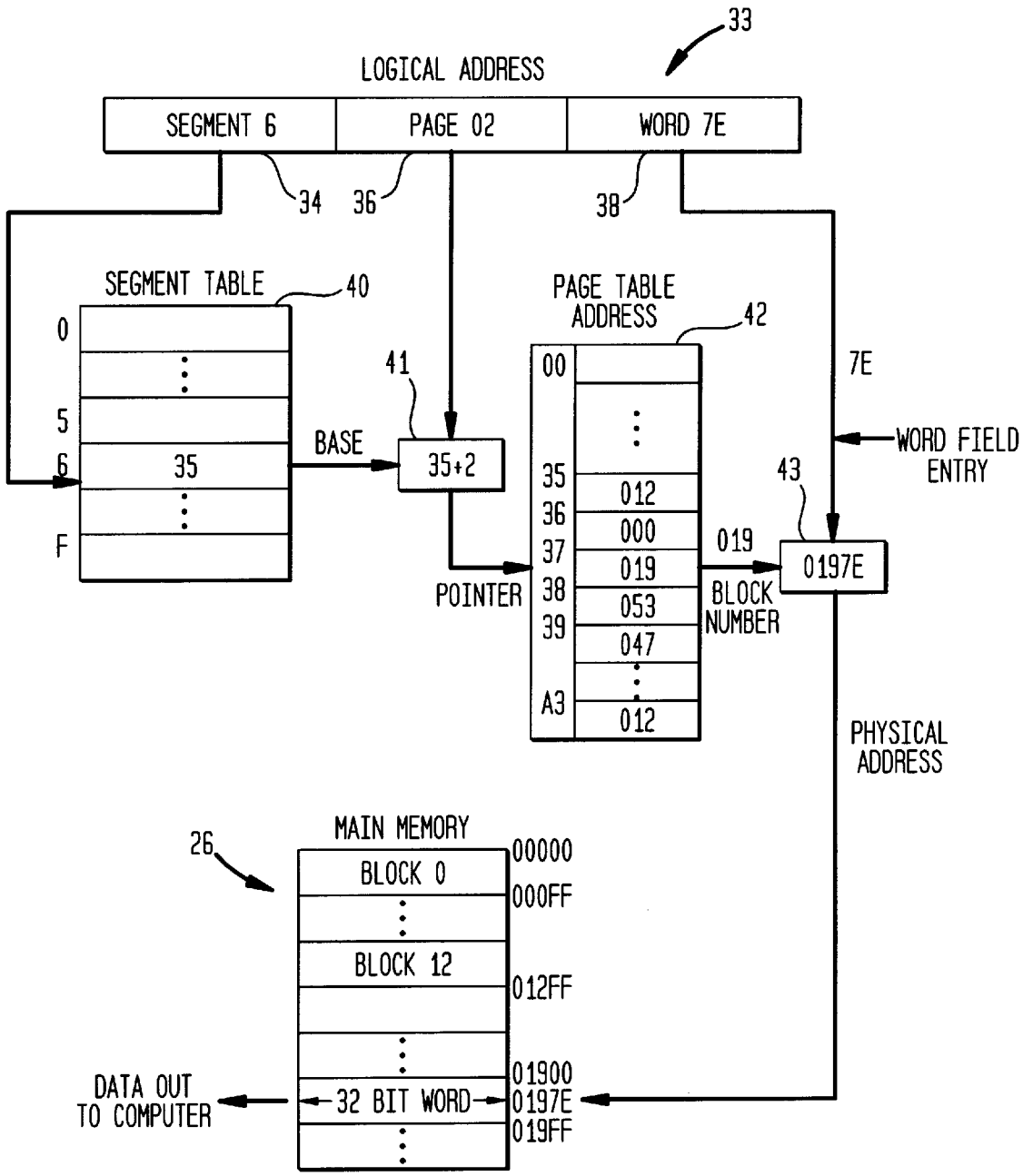
FIG. 2 is a block diagram of a prior art memory management unit.
Figures 3, 4A:
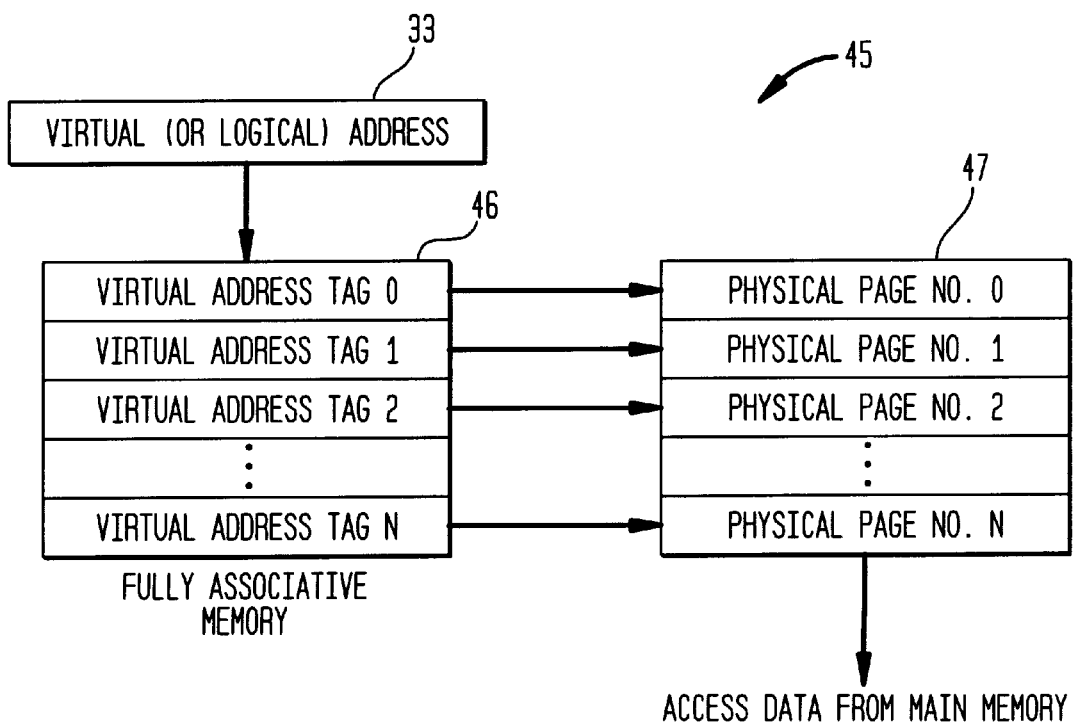
FIG. 3 is a block diagram of an associative memory device used in a prior art memory management unit.
FIGS. 4A and 4B are block diagrams of prior art memory management units.

The virtual address 70 of FIG. 5 corresponds to a data word stored in the main memory 26 of FIG. 1. This virtual address 70 must be translated to determine the physical location of the data word in main memory 26. We assume, for the illustrative example below, that the available physical space in main memory 26 is in discontinuous blocks. The segmentation allocation according to the present invention is based on the physical block space available, and the data words are stored sequentially from low to high virtual addresses in the physical space from low to high physical addresses.

First, available physical space is determined by the computer's operating system. In the illustrative example of FIG. 6, the physical memory (main memory 26) contains a number of unused blocks of space 80, 82, 84, 86. The starting address and size (i.e., the number of available bytes) of these blocks are collected and stored as PA_n values.

FIG. 7 shows a page available mapping table 90, which collects addresses of available physical memory pages. This table has four columns: "Address" 92, "Contents" 94, "Page" 96, and "Status" 98. The "Address" column stores the address of the "Contents" on the table 90. Each "Address" stores data for eight pages. The "Contents" 94 of the table 90 are eight-bit numbers which correspond to the availability pages in a page of physical memory. Thus, for physical addresses 0010 B600–0010 BFFF, the table may have the values shown in FIG. 7. Thus, for physical address 0010B Bxxx the contents of Address 0001 contains the availability states of pages 0010B–0010F. The "Status" 98 column indicates whether or not this page in the block is available to be written in. As shown, each bit in the eight bit words in the "Contents" column 94 is mapped to each available page in the block of physical memory. A "0" bit in a "Contents" entry represents an available page, a "1" represents a used (or unavailable) page. A system having 65,536 ($2^{16}$) pages in memory needs 8,192 ($2^{13}$ or ⅛ of 65,536) bytes in memory to accommodate the page available mapping table (i.e., one byte is eight bits).

Next, the computer program is divided into segments. Unlike segments in the prior art, the segments according to the present invention are determined by the size of the physical main memory 26 space available. The computer program is divided into segments sized to fit existing available spaces in physical memory. The segments are divided regardless of protection attributes. That is, the segment boundaries are not determined by the nature of the program instruction "segments" data etc. In this way "segments" according to the present invention differ from conventional "segments".

An operating system loader allocates the segments according to the entries on the page available mapping table 90, which provides the addresses of available physical memory space (PA). Each segment size and limit value (i.e., the total amount of physical memory space used) is determined. The segment contains a page offset value which is used as a virtual address displacement and is placed into a segment descriptor table (element 104 in FIG. 8). The limit values indicate the virtual address boundaries (i.e., highest and lowest addresses) for each virtual segment and are stored in a limit table (element 102 of FIG. 8). These determination are made as follows.

The size of the first virtual address segment (Size_1) is determined by the size of the first available physical memory space (PA_1). The virtual address limit (limit) is determined by totaling the present and all preceding sizes. The limit for virtual segment n may be defined as limit (n)=$\Sigma_{i=0}^{i=n}$ Size(i). Thus, Limit_1=Size_1. The segment table entry is the lower physical address boundary PA_1 minus the virtual address. Thus, S_1, which is the segment table entry is equal to PA_1, because the lower address boundary of segment 1 is zero.

Next, the second program segment is determined by the next block of physical memory space PA_2. The second segment is determined:

Limit_2=Size_2+Limit_1; S_2=PA_2–Limit_1.

This is repeated and the starting address and size of the nth available segment is determined:

Limit_n=Size_n+Limit_(n–1); S_n=PA_n–Limit_(n–1)

After the segments are collected, the SMMU (Segment Memory Management Unit) according to one embodiment of the present invention, loads the program into the physical memory space. The operating system checks the available page location and the loader allocates the segment locations.

(C) Translatinq the Virtual Address into the Physical Address

FIG. 8 is a block diagram of an SMMU 100 according to the present invention. FIG. 8 also illustrates how the virtual address for a data word in a program is translated into the physical address according to the present invention. The address translation compares the virtual address segmentation field 74 with the limit entries contained on a limit table 102. The entries stored in the limit table 102 store the boundary addresses for the segments stored in the segment descriptor table 104. Because limit entries represent virtual address boundaries, the comparison will indicate whether the virtual address is "greater than/equal to" or "less than" a limit entry. When the address equals or falls between two boundaries, the proper virtual segment value may be determined.

The matching limit table 102 entry determines a proper segment descriptor table 104 entry. The segment descriptor table 104 entries are the physical segment addresses minus the virtual address 70 and are used as virtual segment address displacements. The proper segment value is added with the virtual address segmentation field 74 by an adder 106 to determine a proper address page 108. This address block 108 is concatenated with a page offset field 72 of the virtual address 70 to generate a physical address of the requested data.

The requested data word is physically stored in the main memory 26 in a physical block i.e., one of blocks 80, 82, 84, 86.

(D) Other Tables Created for the SMMU

FIG. 9 shows a data word segment pointer table 110. The data word segment pointer table (or task segment table pointer table) 110 computes a location of the virtual address segment of the requested data word on the segment descriptor table 104 (shown in more detail in FIG. 10). As seen in FIG. 9, an entry in a data word (or task) pointer base register 111, an address space identifier ("ASID") 112 (which identifies a particular data word to be translated), and a reference field access-type 76 portion of a virtual address 70 (see FIG. 5) (if the optional reference field is used) are added by a first adder 114. The output of the first adder 114 is used to locate a pointer stored in the data word segment pointer table 110. This pointer is added to an entry in a data word (or task) segment table base register 115 by a second adder 116. The output of the second adder 116 is used to point to a root in a segment descriptor table 104 describe in more detail below.

Figure 10:
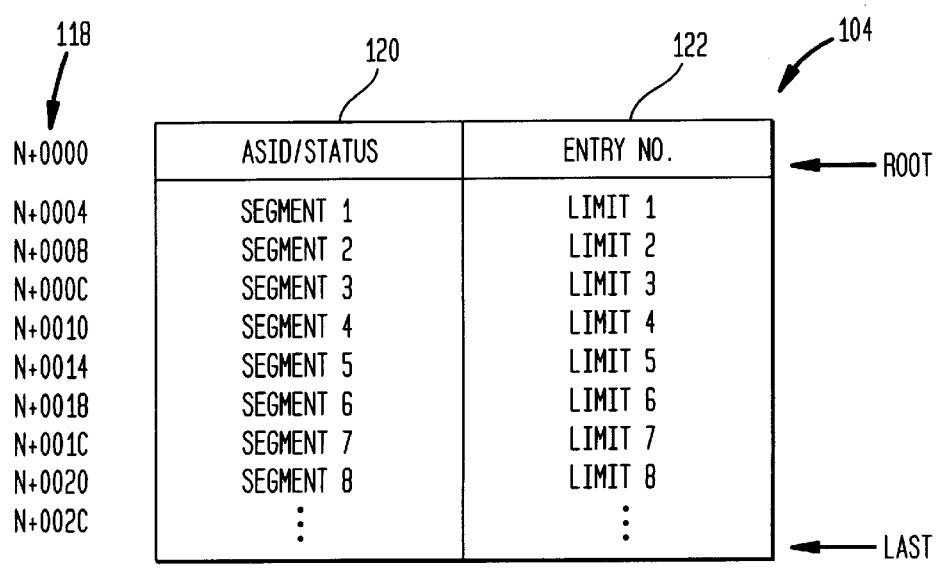
FIG. 10 is a segment descriptor table according to an embodiment of the present invention.

FIG. 10 shows a segment descriptor table 104, which may be stored in the main memory 26. The segment descriptor table 104 has three columns 118, 120, 122. A first column 118 is a base (N) and main memory 26 address for the table entries. In a preferred embodiment, the segment and limit entries are each 16 bits, thus the addresses are 4 bytes (i.e., 32 bits) apart.

A second column 120 includes, as its first entry, the ASID and protection attribute status of the current data word to be translated. The status indicates, for example, if the data word is an instruction or data. The remaining entries in this column are segment entries for the current data word. The segment entries are virtual address displacements. That is, the segment entries are physical segment addresses minus the virtual address. The segmentation field of the virtual address is added with the proper segment entry to determine the physical address block.

The third column 122 has as its first entry an "entry number" which indicates the number of segment entries stored in the segment descriptor table 104 for that data word. The remaining entries are the limits corresponding to the segments listed in the second column. The contents of segment entries and limit entries (such as segment 1, 2,. . . ; limit 1, 2. . .) are listed in ascending order.

There may be one or more segment descriptor tables 104 per program, depending on the value of the reference field. If there is a single segment descriptor table 104, the reference field 76 of the virtual address 70 of FIG. 5 may be omitted. If, however, there are more than one segment descriptor table (i.e., $2^n$ segment descriptor tables as described in detail below) the reference field 76 is needed. This reference field 76 is used to extend the segment descriptor table 104 into a "sequential" register structure as described below with reference to FIG. 12.

For example, if a program has two types of program code segments (a code segment or "CS"), two segment descriptor tables may be used. If, for example, the program has the first type of program code, which is between virtual addresses 0000,0000 to 0×0FFF,FFFF (the two most significant bits of 0×0 is the privilege field portion of the address indicating that the dataword is in the user mode) and the second type of program code segment, which is between virtual addresses 1000,000 to 0×1FFF,FFFF and the page size is 4k (12 bits) page size, two segment descriptor tables 104 are created in the main memory 26 of FIG. 1, and the SMMU may design one sequential register for the task to switch between program type 1 and program type 2 without generating a segment exception. That is, the three least significant digits (FFF) are the page offset field 72, the next four digits (FFFF) are the segmentation field 74, the two bit (1) is the reference field 76, and the two most significant bit (00) are the privilege field 78.

The "root" and "last" indications may be used to mark the first and last entries of a segment descriptor table. This may be helpful because segment descriptor tables may have a variable length (i.e., one segment descriptor table may have three entries, and another may have fifteen).

Any combination of segment descriptor tables 104 may be designed in the SMMU. A preferred method of managing the segment descriptor table is to use a sequence allocation data structure and J. Garwick algorithm.

(E) The SMMU Hardware

The micro-architecture of the segment memory management unit must consider hardware cost and performance issues. Two types of segment register designs are discussed below. These designs are the "basic segment register structure" and the "sequential segment register". Each design has advantages, thus it is preferable for an operating system to control both types of registers.

(1) The Basic Segment Register Structure

The basic segment register structure contains: (a) an ASID/status register; (b) a lower limit register; (c) an upper limit register; and (d) a segment register. The limit and segment registers may be stored in the SMMU.

FIG. 11 shows a portion 125 of previous FIG. 8. Size_3, Limit 2, and Limit_3 are stored in registers 126, 127, 128, respectively, which make up the basic elements for a segmentation memory management system according to one embodiment of the present invention. Those registers, and further including an ASID/status register, form a basic structure of one embodiment of the segmentation memory management system. The ASID/status register stores the information which makes up the first entry of the first column 120 of the segment descriptor table 104 of FIG. 10.

The physical address of a requested program instruction or data word is a random address when the system is executing the program. Thus, the SMMU is preferably dynamic for the program to service any kind of program requirements that it may encounter.

The SMMU registers listed above contain the following:
(a) ASID/status Register

The ASID/status register contains an address space identifier and status of a requested data word. The ASID/status register entry is the first entry in the first column 120 of the segment descriptor table 104 of FIG. 10. This register may also contain additional fields including the reference/ID field, modified, task priority level, memory/disk field, global, instruction/data, and separate/combine.

(b) Lower Limit Register

The lower limit register 127 stores a lower boundary of the currently requested segment. If the virtual address is lower than the entry stored in the lower limit register 127, the SMMU will generate a segment exception/underflow exception. The handler will load a new proper lower segment pair entry from segment descriptor table 104 to the SMMU and re-execute the program, as discussed below in relation to FIG. 16.

(c) Upper Limit Register

The higher limit register 128 stores a higher boundary of the currently requested segment. If the virtual address is higher than the entry stored in the higher limit register 128, the SMMU will generate a TLB miss/overflow exception. The handler will load a new proper higher segment pair entries from the segment descriptor table 104 to the SMMU and re-execute the program, as discussed below in relation to FIG. 16.

(d) The Segment Register

If the virtual address is greater than or equal to the entry stored in the lower limit register 127 and less than the entry stored in the upper limit register 128, then there are no overflow or underflow exceptions and the proper virtual segment is found. The virtual address is added with the entry loaded in the segment register 126 and concatenated with the page offset address field 72 of the virtual address 70 (see FIG. 5) to form the physical address for the processor 22 (see FIG. 1) to access the data word stored in main memory 26.

If there is only a small amount of segment registers 104 in the SMMU, for example only one register, the underflow-overflow exception will occur frequently. Frequent exceptions reduce system performance. Thus, an alternative segment register structure may be preferred. To improve the basic segment register structure performance, a "sequential" segment register structure is used.

(2) The Sequential Segment Register Structure

The sequential segment register structure extends the basic segment register structure discussed above. A preferred embodiment of a sequential segment register 130 according to the present invention is shown in FIG. 12. One segment register 126 in the basic structure is extended to $2^n-1$ segment registers, where n=2, 3, 4 . . . . This places the segment registers into a "sequential structure". The sequential structure is extended to $2^n-1$ segment registers because if, for example, there are two sequential segment entries, the upper limit register for segment i is the same as the lower limit register for segment i+1 (for example, the higher limit of segment 1 is the lower limit of segment 2 as seen in FIG. 14C). Thus, as seen in FIG. 12 if there are three segment registers 126, it implies that the $2^n$ (i.e., 4 or $2^2$) limit registers are needed, not 6. As another example, if there are seven segment registers ($2^3-1$), then eight ($2^3$) limit registers are needed. The structure is called "sequential" because the segment and limit entries are stored in the respective registers in ascending, sequential order.

FIG. 12 shows an SMMU having a sequential segment register 130 structure. The structure includes three segment registers 126, four limit registers 131, 132, 133, 134; and one ASID/status register 136. If the currently requested segment has an address lower than the entry in limit 0 register 131, the SMMU issues a segment exception/underflow exception. An exception handler loads a new, proper lower segment group entry into the SMMU 130 from the segment descriptor table 104 via the databus 24 and re-executes the program. If the currently requested segment has an address higher than the entry in the limit 3 register 132, the SMMU will generate a segment exception/overflow exception. The exception handler go loads a new, proper higher segment group entry into the SMMU 130 from the segment descriptor table 104 via the databus 24 and re-executes the program. This is explained in more detail below.

The sequential comparison is the SMMU basic algorithm which checks the virtual address with the upper and lower address boundaries (limits). Thus, the sequential register structure is suitable for program code segments (CS) and continuing address models and the basic segment register structure is suitable to data segment (DS), extra segment (ES), and global segment (GS) in the random addressing model.

(3) Preferred SMMU Hardware Designs

Figure 13B:
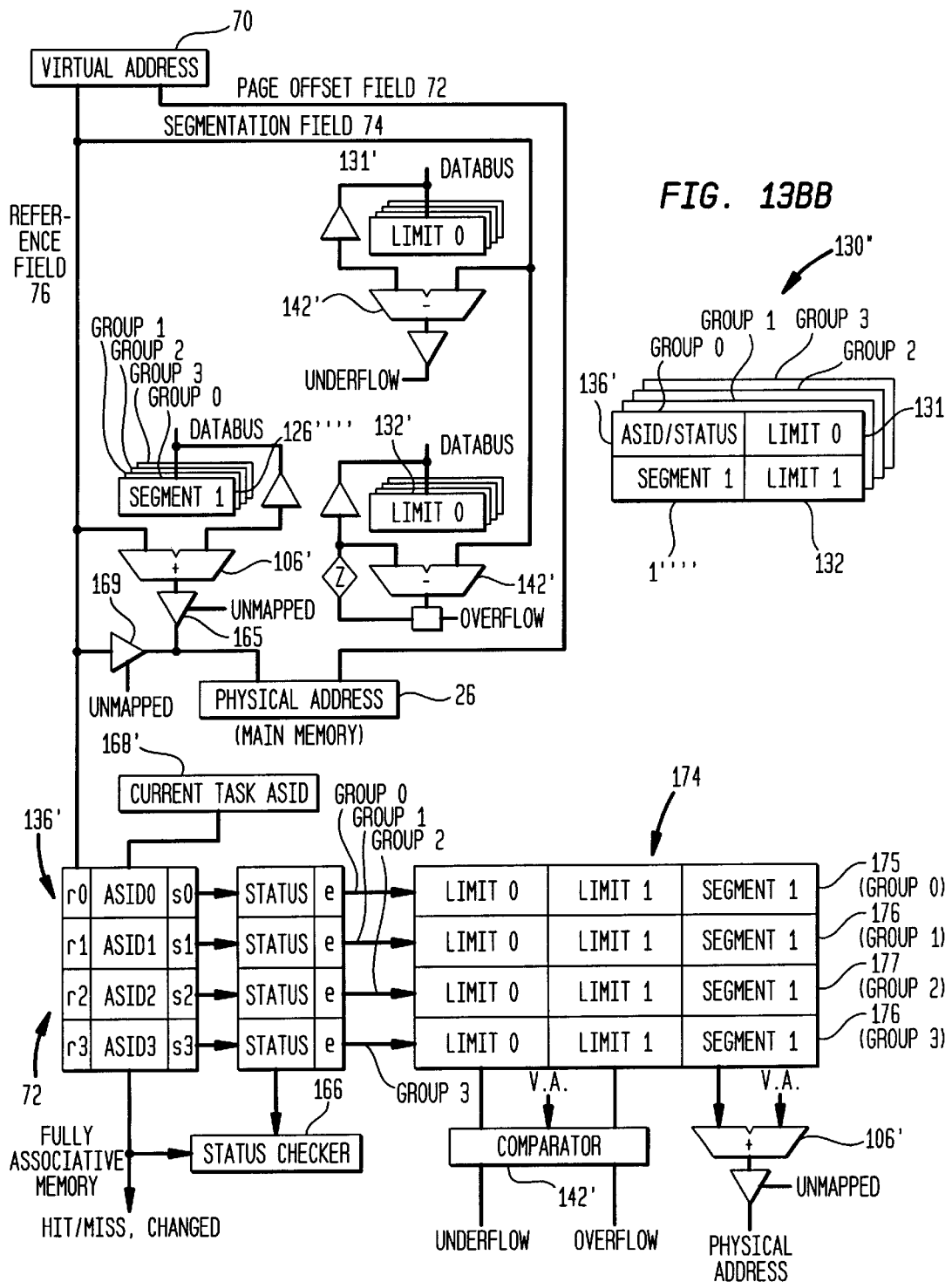
Figure 14:
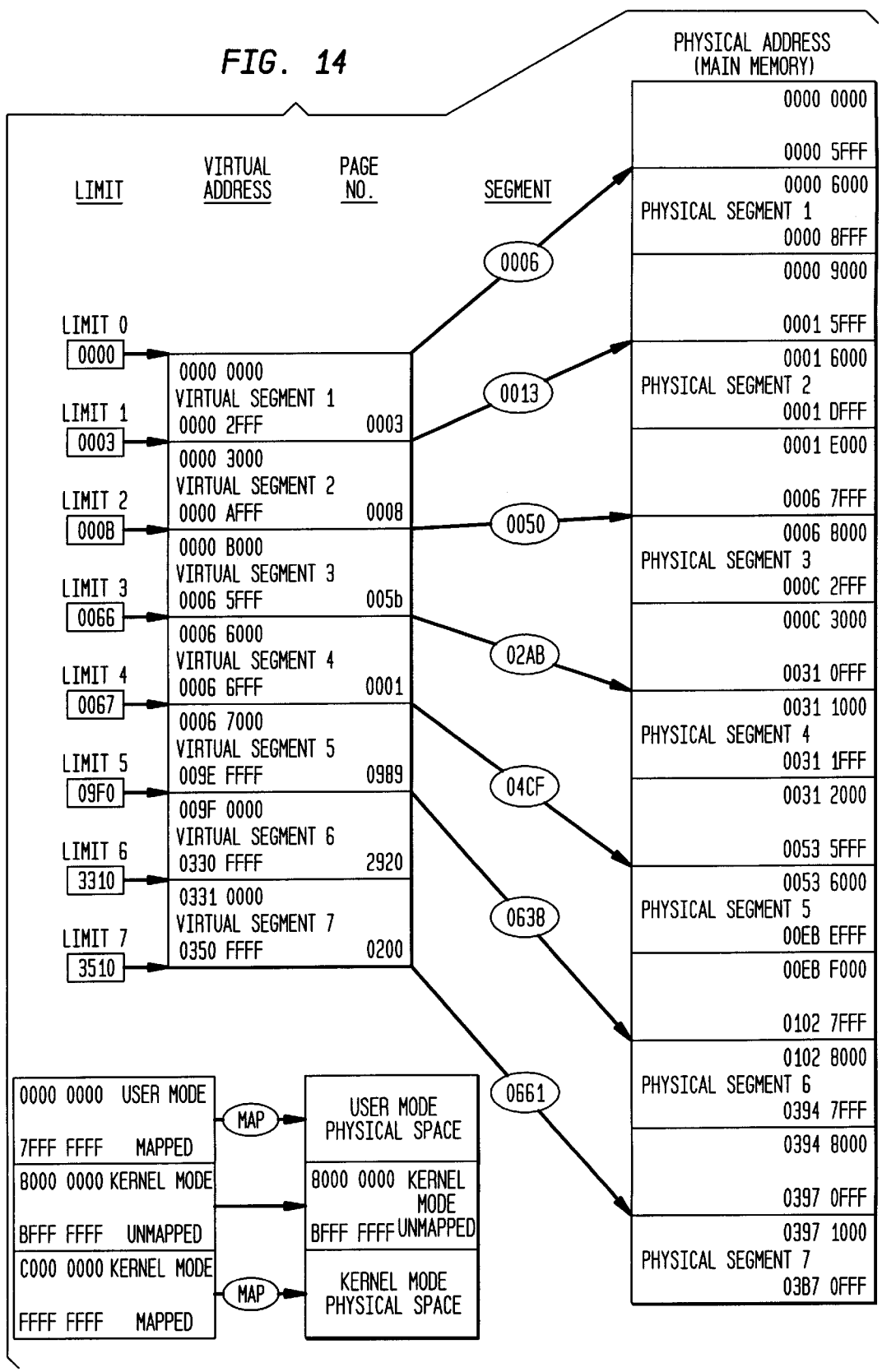
FIG. 14 is a diagram illustrating the relationship between the virtual and physical addresses of a computer program.

FIGS. 13A, 13B, and 14 illustrate preferred designs for an SMMU 100 according to the present invention. Referring to FIG. 14, note that the limit entries are the sum of all preceding page values. For instance, Limit_3 is 66, which is the hexadecimal sum of 3+8+5B. Also note that Segment 1 has a virtual address between 0000 and 2FFF; the corresponding physical address is between 6000 and 8FFF: both have 3000 bytes of space.

Note that the segment register values are the physical address boundaries minus the virtual address boundaries. For example, the lower boundary for the first physical segment is 0000 6000, the lower limit for the first virtual segment, is 0000 0000. The segment register is 6-0=6. (In this illustrative embodiment, the three least significant digits—the page offset field 72—are concatenated after the entry is added with the virtual address segment field.)

FIG. 13A illustrates an SMMU 100' in a sequential register structure and having three segment registers 126', 126", 126'" F (i.e., $2^2-1$ segment registers), four limit registers 131, 132, 133, 134 (i.e., $2^2$ limit registers), and one ASID/status register 136. Each register is extended into a register file, so that each register becomes a multiple register, illustratively shown in FIGS. 13A and 13B as having four files. The register files are illustrated in simplified form in FIG. 13AA. Each of the limit registers has a comparator 142 for comparing the limit entries stored in the limit registers with the segmentation field 74 of the virtual address 70. Each of the segment registers 122', 122", 122'" has an adder 106 (see FIG. 8). The adders 106 are for adding the contents of the segment registers 126 with the segmentation field 74 of virtual address 70 shown in FIG. 8 when activated by logic components 160, 162, 164. The logic components 160, 162, 164 activate a tristate buffer 165 connected to an output of the adders in response to the output of the corresponding comparator 142. The output of the adders 106 is concatenated with the page offset field 72 of the virtual address 70 to provide the physical address of the data word. When the virtual address is unmapped (i.e., the privilege field is "10"), the buffers 165 are turned off, as described below.

The adders 106 and comparators 142 handle the multiple registers formed by the register files. Each data line is configured as one register group. (A dataline may be comprised of a number of data words and may preferably be between one and sixteen words.) The ASID/status register 166, which may be an associative memory, compares the ASID, reference field, and access is type field for the current task 168. If the fields correspond to one of the groups stored in the associative memory 166, a group enable signal is generated for that group. The group enable signal is received by the segment and limit registers so that the appropriate group is sent to the adders 56 and/or the comparators 142.

The reference field 76 of FIG. 5 and access-type field are related to the number of segment descriptor tables 104 created for a task. One task may contain several segment descriptor tables 104. For example, if the reference field has 2 bits and a separate isolation data "I/D" segment is assigned (that is, instructions and data are separated into separately managed units), then I-segments manage instructions and D-segments manage data, then there are 8 segment tables for a task possibility.

The memory structure of the SMMU in FIG. 13A is 4×(112+Ns) (112=7 registers ×16 bits), where Ns is the number of bits in the status registers. The limit 3 register 132 has a zero flag detector 170.

For the upper limit register (here, the limit 3 register 132), the greatest number is 0×0000, and not 0×FFFF (the four least significant digits corresponding to the segmentation field). This is done to overcome a hardware limitation. If an FFFF (16 bits) value is in the upper limit register (limit_3), the virtual address 0_FFFF_000 to 0_FFFF_FFF will generate an overflow exception. However, the first segment table should handle the 0_FFFF_FFF virtual address. If 0000 is the upper limit, however, an overflow exception will not occur from the limit_3 register. This is because in general subtractor design, subtracting 0 always results in a carry (which means overflowing), so if limit 3 is 0, then the overflow signal will always occur and the zero detector 123 will disable a carry flag so no overflow signal will be generated from the limit 3 register. For example, if a task instruction code begins at 0_0000_000 and ends at 1_0030_050 (the three least significant digits are the page offset 72, the next four digits are the segmentation field 74, and the most significant digit is the reference field 76), two segment tables are required. Because in a preferred embodiment, each table contains 16 bits, the first 16 bits (ignore the page offset field because it is concatenated onto the address later) 0000 to FFFF are covered by the first segment table. The second segment table covers 1_0000 to 1_0030. The comparison with the limits is based on a "less than" the upper limit criteria. If an address is greater than or equal to the upper limit, an overflow exception occurs. A problem arises regarding the segment table upper limit register value because, in the preferred embodiment, the segment table segmentation field has only 16 bits. If in the upper limit register is 0×0001 and virtual address is 0_FFFF_0000, then limit_3 will not generate an overflow signal at all because upper limit register limit_3=0×0000. This means upper limit address is 1_0000_000, not 0_0000_000, but in general subtractor design, subtracting 0 results in a carry which indicates overflow. Thus, a zero detector will disable a carry flag so no overflow signal will be generated from the limit_3 register.

FIG. 13B shows an SMMU 100" having the basic structure and has a segment register 126"" with an adder 106 and two limit registers 131', 132' with comparators 142'. The registers of FIG. 13B are shown in simplified form in FIG. 13BB. The signal drive register to the adder 106' or comparator 142' is a fully associative memory 172. The associative memory 172 can pass the current ASID and reference field (virtual address) and access-type to the fully associative memory entries. The access-type field denotes whether the group entry is a code segment (CS) (i.e., a program instruction) or a data segment (DS) (i.e., an entry in a data table). If a hit occurs, the signal will drive one group of registers (i.e., 175, 176, 177, 178) of the group register 179 to the adder (i.e., the segment) or comparator (i.e., the limits).

As seen in FIG. 13B, the fully associative memory 172 also drives the sequential register 174. The fully associative memory 172 contains in a single entry the file of the most recently requested data word ASID and reference and access-type field entries. The status field is copied from the first entry of the second column 120 of a segment descriptor table 104. The memory structure of the SMMU in FIG. 13B is 4×(48+Ns) (48=3 registers×16 bits), where Ns is the number of bits in the status register.

One word line is configured as a group of registers so that the SMMU can switch one task (i.e., data word) to the next task into the segment descriptor table 104 without suspending the processor clock.

Figure 15:
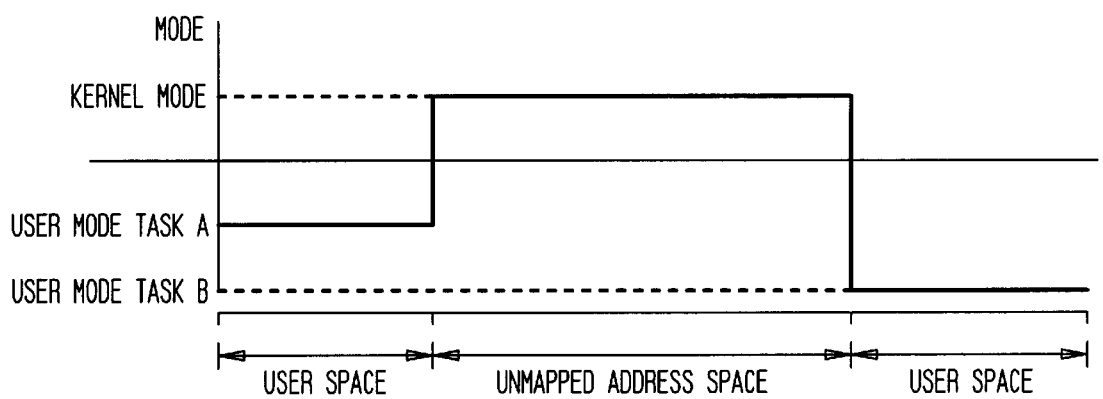
FIG. 15 is a timing diagram for task switching according to an embodiment of the present invention.

During this task switch, the processor's register file must be reloaded with entries from the segment descriptor table 104 in the main memory 26 and reconfigure it in the SMMU's 130 registers. As seen in FIG. 15, during this period the operating system is in the kernel mode and unmapped address areas are used to reconfigure the SMMU registers. An "unmapped" address is a case where the virtual address 70 is the direct memory address (privilege field value of "10" indicates an unmapped address). The case of a direct transfer from a virtual address to a physical address occurs when the SMMU turns on an unmapped signal and lets the tristate buffer 169 of FIGS. 13A, 13B transfer virtual address to physical address, and turns off the other tristate buffers (165 in FIGS. 13A and 13B).

A system may choose to combine or separate the isolation data ("I/D") segment. If the segment is separated, the self-modified program is not allowed in the system, but the number of system exceptions is reduced because isolation segments (i.e., the I-segments and D-segments) are in the SMMU register. Because more segment entries are in the SMMU, the hit rate will increase. When either a virtual address reference field or access-type is changed, the associative memory entry is correspondingly changed, and access to the associative memory is operational. The physical address timing is:

$$T \text{ (physical address)} = T \text{ (associative memory)} + T \text{ (segment adder)} + T \text{ (buffer)}$$

If the associative memory entry is not changed, the timing is:

$$T \text{ (physical address)} = T \text{ (segment adder)} + T \text{ (buffer)}.$$

There is no unique time delay equation in the SMMU address translation. Thus, if the frequency is sufficiently high, the group enable signal (see FIGS. 13A and 13B) is presented in the next clock cycle and the stall instruction (a "stall cycle") is presented to the processor 22 to indicate that it must wait one cycle. A criterion which is important to this embodiment of the invention is if T (cycle)<T (associative memory)+T (segment adder)+T (buffer), then the group enable signal is presented in the next cycle, otherwise it is presented during the current cycle. A transparent latch is preferred for the group enable signal.

The status field and the hit and miss and change signals are transferred to the status checker 166 for an address permission operation. The status field may contain other fields apparent to those skilled in the art. The status checker 166 is a unique mechanism in the SMMU. Because neither the basic nor sequential signal can identify whether an exception situation occurs, in both the basic structure and sequential segment register, hit/miss signal, and the status field are sent to the status checker 166 to determine whether an exception occurs or not.

(F) Segment Register Reload and Underflow/Overflow Operations

FIG. 16 illustrates the underflow/overflow exception operation sequence. The segment register reload work flow includes two manners of operation for the segment register to reload the segment descriptor table 104 entries. The first is a simple operation in which each read/write goes through the data bus 24 and control signals come from the processor 22 when it executes load/store instructions. Each read/write register is at a memory/cycle time once.

The second operation is a register-shift operation in which the segment register 126''' and limit registers 131'', 132'' are up/down shifted by the processor. For example, if an overflow 152 occurs, the SMMU executes the following shift:

limit 0←limit 1←limit 2←limit 3; segment 1←segment 2←segment 3, in three processor cycle times.

If an underflow 154 occurs, the SMMU executes the following shift:

limit 0→limit 1→limit 2→limit 3; segment 1→segment 2→segment 3, in three processor cycle times.

This second segment register reload operation is faster than the first, but either operation may be used.

(G) Design Considerations

The SMMU architecture is designed for a small system. Therefore, size efficiency is an important consideration in the design of a preferred embodiment of the present invention. In a preferred system, DRAM/main memory is the lowest level in the memory hierarchy and a disk or flash memory (e.g., a flash EPROM) or network is the optional auxiliary memory 31 in FIG. 1, such as an x86 based PC running on MS-DOS. The programming data will never exceed 640k bytes of space. There are many application systems where a DRAM is the lowest level in a memory hierarchy, for example in a simple low cost/high reliability embedded controller system such as an x-terminal, laser jet printer, personal digital assistant, communicator, 2D/3D t.v. game machines, personal computers, and others.

The price per bit of DRAMs continues to decrease while the storage capacity is increasing. For example, a 16 megabyte DRAM will be mass produced in 1995 so that a system may contain a large memory at a price affordable to most end users. Another factor to a computer system is the time cost penalty of a page "miss". A cache memory miss time penalty is 2 to 4 times as lengthy as a cache hit (a cache memory is a small, very fast memory storing the most recently used data words placed between the main memory and the processor.) A page miss, however, is 1,000 to 10,000 times as costly as a page hit (because the processor must retrieve a page of data from the auxiliary memory 31). Thus, there is an incentive to design a MMU which has an improved ability to load an entire program in main memory.

Figure 4B:
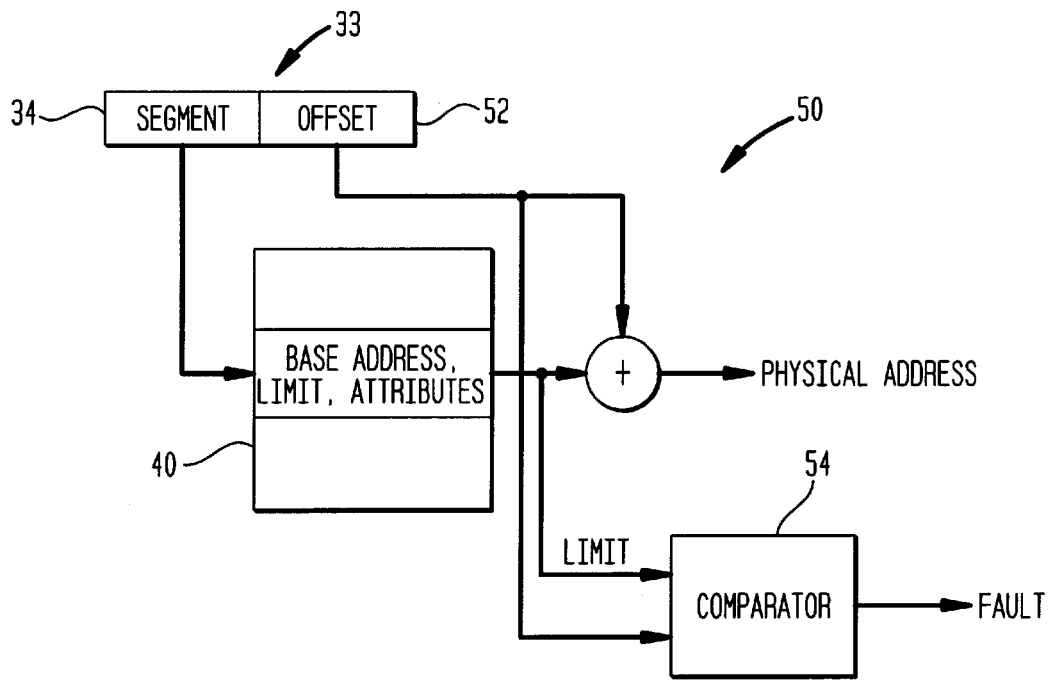
Figure 4C:
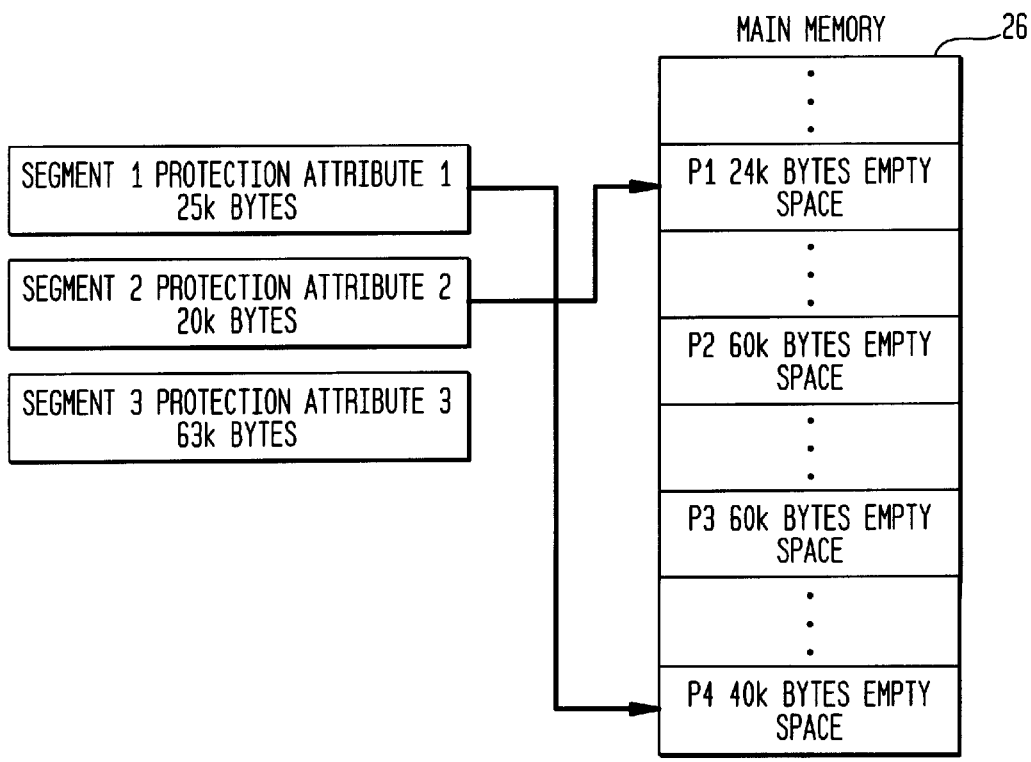
FIG. 4C illustrates a drawback of prior art memory management system.

Even though main memory may be large and inexpensive, the memory management is essential for a computer system. For example, many program instructions or data are shared and if a simple address displacement method, as described in relation to FIGS. 4B and 4C, is used, then a "not enough memory" fault occurs frequently and wasteful, redundant memory allocation is necessary.

On the other hand, if a computer system applies a complex MMU method, as described above in the Background of the Invention, memory efficiency is improved, but the chip area and silicon resources are consumed by this method, affecting both performance and price.

The SMMU is transparent to the software. In application programs, the user does not use the load segment register instruction. The SMMU and operating system maintain the data word segment description table automatically and the data word allocation is arranged by the operating system loader.

(H) Conclusion

A memory management unit is disclosed which defines and loads program segments based on available physical memory spaces. One or more segments is created for each task. These segments may be divided into groups depending on the protection status of the data. The virtual memory address is translated into a physical address by comparing a segmentation field with a group of limit registers, which finds the relevant entry in a group of segment registers. This entry is added to the segmentation field to determine a block. The block is concatenated with an entry in the page offset field to provide the physical address.

The present invention is not limited to the disclosed embodiment, but rather various modifications, substitutions, and structures may be used without departing from the scope of the present invention.

What is claimed is:

1. A method for loading a program into a memory having a plurality of discontinuous memory spaces, comprising the steps of:
   a. determining a size and address of at least some of the plurality of discontinuous memory spaces;
   b. generating a page available mapping table indicating availability of pages of memory space; comprising the steps of;
      i. mapping one bit to each page of memory space;
      ii. designating available pages with a first logic level; and
      iii. designating unavailable pages with a second, opposite logic level;
   c. dividing the program into segments, each segment having a size defined by the size of one of the plurality of discontinuous memory spaces; and
   d. loading the divided segments into the discontinuous memory spaces.

2. A method for loading a program into a memory having a plurality of discontinuous memory spaces, comprising the steps of:
   a. determining a size and address of at least some of the plurality of discontinuous memory spaces;
   b. generating a page available mapping table indicating availability of pages of memory space;
   c. dividing the program into segments, each segment having a size defined by the size of one of the plurality of discontinuous memory spaces; the step of dividing comprising:
      i. determining a segment entry for each segment;
      ii. determining a limit value for each segment;
      iii. storing each segment entry in a segment descriptor table; and
      iv. storing each limit value in a limit table; and d. loading the divided segments into the discontinuous memory spaces.

3. The method of claim 1, further comprising generating a plurality of segments for a single task.

4. The method of claim 3, wherein $2^n$ segments are generated for the single task, where n is a number of bits in a reference field of a virtual address.

5. The method of claim 2, wherein the step of determining an entry comprises the following determination:

$$S\_n = PA\_n - \text{Limit}\_(n-1).$$

where S_n is the segment descriptor table entry of segment n;

PA_n is a physical address of a discontinuous memory space; and $$\text{Limit}\_(n-1) \text{ is } \sum_{i=1}^{i=n} (\text{size})\ (i-1).$$

wherein size is a size of a virtual address segment.

6. The method of claim 2, wherein the step of determining a limit value comprises the following determination:

$$\text{Limit}\_n = \text{Size}\_n + \text{Limit}\_(n-1)$$

where

Limit_n is the limit value of segment n;

Size_n is the size of segment n; and $$\text{Limit}\_(n-1) \text{ is } \sum_{i=1}^{i=n} (\text{size})\ (i-1).$$

7. The method of claim 2, wherein the step of loading further comprises loading the segments sequentially in an ascending order of physical addresses.

8. A method for translating a virtual address for a program into a physical address, comprising the steps of:
   a. comparing a segmentation field of the virtual address with a group of entries in a limit table to determine a corresponding entry in a segment register, each entry comprises the following determination:

$$S\_n = PA\_n - \text{Limit}\_(n-1);$$

where S_n is the segment descriptor table entry of segment n;
      PA_n is a physical address of a discontinuous memory space $$\text{Limit}\_(n-1) \text{ is } \sum_{i=1}^{i=n} (\text{size})\ (i-1).$$

wherein size is a size of a virtual address segment,
   b. adding the corresponding entry in the segment register with a field of the virtual address to determine an address block; and
   c. concatenating the address block with an offset field of the virtual address to produce the physical address.

9. The method of claim 8, wherein the step of comparing generates one of either a greater than and an equal to/less than result.

10. The method of claim 8, wherein the step of comparing further comprises generating a pointer for pointing to a relevant entry in the segment descriptor table.

11. The method of claim 10, wherein the step of generating a pointer comprises adding entries in an address space identifier register and a data word pointer base register.

12. A method for translating a virtual address for a program into a physical address, comprising the steps of:
   a. comparing a segmentation field of the vital address with a group of entries in a limit table to determine a corresponding entry in a segment register, comprising:
      i determining an underflow occurs when a segment address is lower than an entry stored in a limit register; and
      ii. loading a new lower segment group entry from a segment descriptor table into the limit register;
   b. adding the corresponding entry in the segment register with a field of the virtual address to determine an address block; and
   c. concatenating the address block with an offset field of the virtual address to produce the physical address.

13. A method for translating a virtual address for a program into a physical address, comprising the steps of:
   a. comparing a segmentation field of the virtual address with a group of entries in a limit table to determine a corresponding entry in a segment register, comprising:
      i. determining an overflow occurs when a segment address is higher than an entry in a limit register; and
      ii. loading a new higher segment group entry from a segment descriptor table into the limit register;
   b. adding the corresponding entry in the segment register with a field of the virtual address to determine an address block; and
   c. concatenating the address block with an offset field of the virtual address to produce the physical address.

14. A method for translating a virtual address for a program into a physical address, comprising the steps of;
   a. comparing a segmentation field of the virtual address with a group of entries in a limit table to determine a corresponding entry in a segment register;
   b. adding the corresponding entry in the segment register with a field of the virtual address to determine an address block; and
   concatenating the address block with an offset field of the virtual address to produce the physical address; and
   d. if the virtual address is unmapped, directly translating the virtual address into the physical address.

15. The method of claim 8, further comprising the step of reloading the segment register after the virtual address is translated.

16. A method for translating a virtual address for a program into a physical address, comprising the steps of:
   a. comparing a segmentation field of the virtual address with a group of entries in a limit table to determine a corresponding entry segment register;
   b. adding the corresponding entry in the segment register with a field of the virtual address to determine an address block;
   c. concatenating the address block with an offset field of the virtual address to produce the physical address; and
   d. reloading the segment register after the virtual address is translated, the step of reloading further comprising:
      i. sending a read/write signal to the segment register; and
      ii. sending a control signal to the segment register.

17. A method for translating a virtual address for a program into a physical address, comprising the steps of:
   a. comparing a segmentation field of the virtual address with a group of entries in a limit table to determine a corresponding entry in a segment register;

b. adding the corresponding entry in the segment register with a field of the virtual address to determine an address block;

c. concatenating the address block with an offset field of the virtual address to produce the physical address; and d. reloading the segment register after the virtual address is translated, the step of reloading further comprising shifting the entries in the segment and limit registers.

18. The method of claim 17, wherein the step of shifting comprises if a work underflow occurs, shifting up; and if a work overflow occurs, shifting down.

19. A method for translating a virtual address for a program into a physical address, comprising the steps of:

a. using a reference field in the virtual address to select a group enable signal;

b. using the selected group enable signal to determine which group of entries in a limit table is to be compared with a segmentation field of the virtual address;

c. comparing a segmentation field of the virtual address with entries on a limit table;

d. selecting a limit table entry based on the comparison;

e. adding a corresponding entry in a segment register with a field of the virtual address to determine an address block; and f. concatenating the address block with an offset field of the virtual address to produce the physical address.

20. The method of claim 19, further comprising the step of using the reference field to determine which group in the segment register is the corresponding entry.

21. A displacement segmentation memory management unit (SMMU), having at least:

an address space identification (ASID)/status register in a main memory, configured to store an ASID/status for a current data word;

a segment register in the SMMU and connected to a lower limit register and a higher limit register, configured to store a segment for the current data word;

the lower limit register in the SMMU configured to store a lower limit of the segment stored in the segment register and connected to the ASID/status segment register;

the higher limit register in the SMMU configured to store a higher limit of the segment stored in the segment register and connected to the ASID/status register;

wherein the improvement comprises:

a. a data word segment pointer table configured to receive a base address and to store a pointer to an entry in a segment pointer table; and b. the segment descriptor table being configured to store segment entries, ASID/status, and entry numbers for a data word.

22. The SMMU of claim 21, further comprising a data word pointer base register configured to store a base and an adder configured to receive an output of the data word segment pointer table and of the data word pointer base register.

23. The SMMU of claim 21, wherein the SMMU is arranged in a sequential segment register structure comprising $2^n$ limit registers, $2^n-1$ segment registers, and at least one ASID/status register.

24. The SMMU of claim 23, wherein the virtual address comprises a page offset field; a segmentation field; a reference field; and a privilege field.

25. The SMMU of claim 24, wherein the segmentation field has less than or the same amount of bits as are stored in the segment register.

26. The SMMU of claim 24, wherein the segmentation field has the same number of bits as are stored in the limit register.

27. The SMMU of claim 21, wherein the SMMU comprises a plurality of limit registers including a limit 0 register and zero being the highest value stored in the higher limit register and zero is the lowest value stored in the limit 0 register.

28. The SMMU of claim 21, wherein each limit register has an output connected to a comparator and each segment register has an output connected to an adder.

29. The SMMU of claim 21, further comprising a status checker connected to receive an output of the ASID/status register.

30. The SMMU of claim 21, wherein each of the ASID/status registers, segment registers, lower limit registers, and higher limit registers is configured as a register file, each file comprising a group of entries.

31. The SMMU of claim 21, wherein the ASID/status register file is configured to generate a group enable signal in response to a reference field of the virtual address.

32. The SMMU of claim 31, wherein the entries of each register file are stored in an associative memory.

33. The SMMU of claim 32, wherein the associative memory is configured to drive a group of entries to one of a comparator and an adder in response to the group enable signal.

* * * * *